Patented Aug. 21, 1951

2,564,926

UNITED STATES PATENT OFFICE 2,564,926

AGENTS FOR RENDERING CLEANERS' SOLVENTS ELECTRICALLY CONDUCTIVE

Pascal M. Rapier, Redondo Beach, Calif., assignor to Great Lakes Carbon Corporation, Chicago, Ill., a corporation of Delaware No Drawing. Application June 21, 1948, Serial No. 34,355

4 Claims. (Cl. 252—161)

This invention relates generally to the dry cleaning of fabrics and specifically to means by which the solvents used by dry cleaners may be rendered electrically conductive and maintained in that condition.

A purpose of the invention is to provide a filter aid through the use of which a used solvent may be clarified for reuse and simultaneously rendered electrically conductive.

A purpose of the invention is to provide methods and agents through the use of which in the clarification of used solvents the redeposition of soil and lint on the cleaned fabrics may be prevented.

The accumulation of static electrical charges in the cleaning bath is responsible for causing redeposition of soil and lint on the fabrics, the charge increasing during the period of the run unless preventive steps are taken. The redeposition of soil solids is detrimental to the appearance of white and light colored fabrics while the accumulation of lint on dark colored woolens, velvets and the like is still more detrimental to the quality of the finished work.

It is common, in fact almost invariable practice, to regenerate the used solvent from a dry cleaning operation by contacting it with a powdered solid and filtering to clarity. This solid may be a diatomaceous earth filter aid, or it may be a so-called "sweetener" consisting of diatomaceous earth, an adsorbent clay, carbon or any mixture of these three materials. This contact may be effected by adding the powder to the batch in the washer and thereafter filtering it out of the solvent or, if preferred, the powder may be formed up as a filter cake and the used solvent passed through it. In any manipulation the powder is brought into intimate contact with and removes from the solvent all suspensoids, either solid or liquid, and also any solutes which it is capable of preferentially adsorbing.

I have discovered that the organic solvents used in dry cleaning may be rendered electrically conductive, so that static charge may continuously be dissipated from a grounded washer, by adding to the filtering powder a minute proportion of a surface-active agent having the properties below described, such agent being a selected member of the group consisting of the alkylated aryl sulfonates and the oil-soluble petroleum sulfonates (the so-called "mahogany" sulfonates) in the form of the alkali metal or alkaline-earth metal salts.

By reason of the conditions under which it is used, the choice of an agent for this purpose is sharply limited, the properties essential to a successful result being as follows:

(a) The agent must be at least slightly soluble in Stoddard solvent and the other organic solvents used in commercial dry cleaning, referred to hereinafter as "nonpolar solvents," for example, Stoddard solvent, benzene and the various chlorinated hydrocarbons. The desired effect of causing electrical conductivity is dependent on solubility, dispersions of insoluble surface-active agents being ineffective;

(b) The agent must be harmless to garments and equipment in the concentrations at which it is to be used in dry cleaning solvents;

(c) The solubility should preferably, but not necessarily, be of a low order, to prevent undue accumulation of the agent in the solvent after repeated use.

(d) An extremely dilute solution of the agent in a nonpolar solvent must have a low electrical resistivity, preferably not exceeding 130,000 megohms and in no case exceeding 180,000 megohms per centimetre cube;

(e) The agent must be compatible with the superfatted oleic and lauric acid soaps commonly used as detergents in dry cleaning operations, i. e., its property of lowering resistivity must be maintained in batches to which such soaps are added;

(f) The agent must not be adsorbed or removed by the filter aid, i. e., the conductivity of the treated solvent must not be reduced below the limits above stated by filtration to complete clarity;

(g) The agent must be stable in storage when blended with the filtering powder in suitable proportions, i. e., it must be immune to oxidation and to hydration by adsorption of water from the atmosphere with consequent loss of solubility;

(h) Preferably, but not necessarily, the physical characteristic of the agent should be such as to render it easy to disperse evenly and in minute proportion in a mass of the filter powder. The agents which may be reduced to the form of a fine powder are preferable to such as are liquid, semiliquid or waxy.

Various previously known agents are capable of imparting conductivity to a nonpolar solvent, but each of the groups heretofore employed has at least one disadvantage in practical application.

Thus, the oleic and lauric acid soaps impart conductivity, but only when they are rendered oil-soluble by the addition of a free fatty acid (oleic or lauric). This addition is objectionable by reason of the difficulty experienced in removing the acid completely from the cleaned fabrics and the consequent risk of development of rancidity. This agent is further undesirable as being completely removed from the solvent by filtration, even with a nonadsorbent filter aid, it thus being necessary to add new agent to the solvent at each cycle.

The oleates and laurates of magnesium and other of the alkaline-earth metals are oil-soluble and are efficient aids to conductivity, but only when completely anhydrous. They lose their effectiveness rapidly in contact with atmospheric moisture or in a solvent containing water.

Some of the alkaline-earth naphthenates are freely oil-soluble and produce an important increase in conductivity. They must be completely anhydrous to be effective and have the further drawback that they are substantially completely removed by filtration.

The only conductance agents which, to my present knowledge, meet all of the above requirements, are the alkali metal and alkaline-earth metal salts of (1) the oil-soluble or so-called "mahogany" petroleum sulfonic acids, and (2) the alkylated benzene and naphthalene sulfonic acids, preferably those in which the alkyl chain contains not less than three nor more than about twenty carbon atoms. These are the true sulfonic acids, in which sulfur is coupled directly with an aromatic ring, as distinguished from the alcohol sulfates in which the linkage is through an oxygen atom.

The effectiveness of these agents in producing and maintaining conductivity in a non-polar solvent is illustrated in certain experiments in which various commercial surface-active agents were tested in the following manner:

(a) A quantity of the agent equal to about 0.0125% by weight (25 milligrams in 250 ml. of solvent) was agitated with clean, dry Stoddard solvent until solution had reached its limit. In most instances a part of the added agent remained undissolved.

The solution thus obtained, which in most cases was an extremely tenuous saturated solution, was tested for electrical resistivity using the instrument known commercially as the "Magabridge" and employing a cell which gave an instrument reading of about 4,000 megohms with the untreated solvent. The multiplication factor to convert the indications of this cell to specific resistivity (megohms per centimetre cube) is 100.

(b) Five grams of a diatomaceous earth filter aid was agitated strongly with the above solution, after which the solution was filtered to complete clarity and the resistivity of the filtrate again determined.

The results of these determinations are tabulated below. A comparison of the first resistivity figure with the approximately 4000 megohm resistivity of the untreated solvent shows the inherent effectiveness of the agent. Comparison of the figure shown in the second column with that appearing opposite it in the first column indicates the extent, if any, to which the agent is withdrawn from solution and rendered ineffective in the clarification with diatomaceous earth.

TABLE 1

*Mahogany oil (petroleum) sodium sulfonates*

| Ref. No. | Molecular Structure of Agent | Before Filtration | After Filtration |
|---|---|---|---|
| 1 | Unknown | 800 | 1,400 |
| 2 | do | 1,000 | 1,350 |
| 3 | do | 1,300 | 1,300 |

TABLE 2

*Alkyl aryl sodium sulfonates*

| Ref. No. | Molecular Structure of Agent | Before Filtration | After Filtration |
|---|---|---|---|
| 4 | Decyl benzene sodium sulfonate | 100 | 200 |
| 5 | An alkyl benzene sodium sulfonate | | 340 |
| 6 | Dodecyl benzene sodium sulfonate | 285 | 490 |
| 7 | Isobutyl naphthalene sodium sulfonate | 270 | 710 |
| 8 | Mono and dibutyl naphthalene sodium sulf. | | 710 |
| 9 | An alkyl benzene sodium sulfonate | 380 | 770 |
| 10 | Isopropyl naphthalene sodium sulfonate | | 1,350 |
| 11 | Isopropyl naphthalene sodium sulfonate | | 1,350 |

TABLE 3

*Alkyl aryl calcium sulfonates*

| Ref. No. | Molecular Structure of Agent | Before Filtration | After Filtration |
|---|---|---|---|
| 12 | Dodecyl benzene calcium sulfonate | 1,200 | 1,400 |
| 13 | Isobutyl naphthalene calcium sulfonate | 1,200 | 1,300 |
| 14 | Mahogany oil calcium sulfonate | 1,200 | 1,200 |

These figures, which are supported by many other experiments not recorded here, indicate that the petroleum sulfonates are effective agents for lowering the resistivity of nonpolar solvents, though less effective per se than the alkylated benzene and naphthalene sulfonates, and that they are partially but not entirely immune to removal by filtration. It is also indicated that the sulfonates having a single benzene ring are somewhat more effective than the naphthalene sulfonates, and that the sodium salts are somewhat more effective than the calcium salts.

In the use of the alkyl aryl sulfonates the best results will be obtained with salts in which the alkylating chain contains not less than three nor more than about twenty carbon atoms. This observation is based on the following considerations:

There is little doubt that the function of the salt as an electrolyte is due to its content of metal, and no doubt whatever that this function is exercised only by the salt in solution. As the proportion of metal in the salt is decreased by increasing the length of the hydrocarbon chain, the intrinsic electrolytic effect diminishes while the solubility increases.

So far as I am able to determine from the information now available, salts having less than three carbon atoms in the alkylating chain fail to be fully effective by reason of insufficient solubility in the nonpolar solvents, while such as have more than about twenty carbon atoms in the chain fail to be fully effective by reason of insufficient intrinsic electrolytic effect. It should be noted, however, that where the solubility is very high, as in the case of the petroleum sulfonates, salts of higher molecular weight and with correspondingly smaller proportions of combined metal may be sufficiently effective for practical purposes, when used in relatively large quantity.

The above named agents may if preferred be added directly to the solvent bath, and while the practice is uneconomical I contemplate their use in that manner. However, the addition in accurate proportion of the minute quantity of agent required is a delicate and time-consuming operation, in particular as most of these agents pass into solution very slowly. I very much prefer, therefore, to utilize the filtering powder as a carrier for the agent, dispersing it intimately throughout the mass of powder. When so dispersed it passes into solution more rapidly and the quantity added to the solvent is controlled by the measurement of a relatively large proportion of powder rather than by that of an extremely minute proportion of the agent itself.

A further and important advantage in the intermixture of the surface-active agent with a filter aid functioning as a carrier lies in the fact that, when intimately intermixed and wetted with the solvent, the agent adheres to the particles of carrier and is not subject to being entrapped and removed from the operation in the fabrics being cleansed. By such intermixture the agent is brought completely into solution, however low its solubility, as any part of the agent which does not dissolve in the washer is carried into the filter cake where it is in contact with a flow of solvent until dissolved. This permits the use of a much smaller proportion of the agent than would be effective in the absence of a carrier.

The optimum relation of agent to solvent is variable with the solubility of the agent, its unitary effectiveness in producing conductivity, and the extent if any to which it is withdrawn from the bath by adsorption on the cleansed fabrics. Some of the highly effective alkyl aryl sulfonates are soluble in cold nonpolar solvents in proportions less than 0.01% by weight and with these agents the best results are obtained in the use of saturated solutions. Other members of this group are more soluble and produce their optimum result when used in larger proportions, ranging from 0.01% to 0.1% of the weight of solvent. The less effective petroleum sulfonates and alkaline-earth metal salts may be used in proportions ranging from 0.01% to 0.5% by weight. Up to the latter figure the only drawback to the use of an excess over the actually required quantity is the cost of the agent unnecessarily used.

The proportion of agent to be admixed with a filtering powder is based on the same considerations and also on the relation between quantity of filter aid used and quantity of solvent cycled in a particular operation. It is wasteful to add more of the agent than will pass into solution under the conditions of use, and undesirable to use an excess of the more soluble agents, such as the petroleum sulfonates. Generally speaking, the weight relation of agent to filter aid may range from 0.01% to as much as 5%.

The addition of the surface-active agent to a filtering powder consisting entirely or largely of diatomaceous earth has a highly beneficial effect on the behavior of the powder on its addition to the solvent. Diatomaceous earth is not readily wetted by a nonpolar solvent and when added to it, even with strong agitation, tends to form lumps or balls which can be dispersed only slowly and with difficulty. The intermixture of surface-active agent with the earth completely avoids this difficulty, rendering the light and fluffy powder instantly dispersible in the solvent.

The maximum resistivity of solvent consistent with the avoidance of linting will vary to some extent with the manner in which the washer is handled and the nature of the fabrics being cleansed. I have determined, as the result of experience, that a result which is satisfactory in many but not all cases may be produced by reducing the cell resistivity of the solvent to about 1800 megohms (equivalent to specific resistivity of 180,000 megohms per centimetre cube) and that linting and soil redeposition may be inhibited in all cases by lowering the cell resistivity to about 1300 megohms (specific resistivity 130,000 megohms). The lowest cell resistivity which I have actually observed is 100 megohms (10,000 megohms specific resistivity) but there would be no drawback to still further reduction if it could be produced.

The methods of imparting conductivity to nonpolar solvents heretofore proposed have all depended on the presence in the solvent of a dry cleaning soap. While the presence of these soaps during the break period is desirable, by reason of their detergent effect, they must be rinsed out of the cleansed fabrics as completely as possible to avoid soap residue and rancidity in the finished work. And as these soaps, together with the conductivity which they produce, disappear when the solvent is filtered, it follows that the resistivity rises rapidly during the rinse period, which is the particular stage of the operation in which linting and soil redeposition are the most likely to occur and the most objectionable.

A major advantage inherent in the use of the new agents disclosed herein lies in the fact that they are effective in the absence of soaps and thus remain present in the solvent after the soaps have been withdrawn, thus protecting the fabrics against linting in both the break and rinse periods of the treatment. The lowering of resistivity to the point at which linting is positively prevented (to about 130,000 megohms per centimetre cube) in the absence of a dry cleaning soap has not heretofore been accomplished, so far as I am aware.

The application of these agents, and particularly those of lower solubility, in the form of a mixture with the filter aids used in the prevailing cyclic process, offers further protection to the fabrics during the rinse period. This because the filter cake always contains enough of the undissolved agent to replace loss of agent from the solvent by adsorption on the fabrics being cleansed, thus ensuring that the solvent returns to the washer at the maximum conductivity.

I claim as my invention:

1. An agent for clarifying and imparting electrical conductivity to a nonpolar dry cleaning solvent: a powder consisting substantially of diatomaceous earth together with from 0.1% to 5.0% by weight of a salt selected from the group consisting of the sodium and calcium sulfonates of dodecyl benzene and isobutyl naphthalene and the sodium sulfonates of decyl benzene and isopropyl naphthalene.

2. An agent for clarifying and imparting electrical conductivity to a nonpolar dry cleaning solvent: a powder consisting substantially of diatomaceous earth together with from 0.1% to 5.0% by weight of the sodium salt of dodecyl benzene sulfonic acid.

3. An agent for clarifying and imparting electrical conductivity to a nonpolar dry cleaning solvent: a powder consisting substantially of diatomaceous earth together with from 0.1% to 5.0% by weight of the sodium salt of decyl benzene sulfonic acid.

4. An agent for clarifying and imparting electrical conductivity to a nonpolar dry cleaning solvent: a powder consisting substantially of diatomaceous earth together with from 0.1% to 5.0% by weight of the sodium salt of isobutyl naphthalene sulfonic acid.

PASCAL M. RAPIER.

REFERENCES CITED

The following references are of record in the file of this patent:

UNITED STATES PATENTS

| Number | Name | Date |
| --- | --- | --- |
| 2,053,007 | Parkhurst | Sept. 1, 1936 |
| 2,072,332 | Hatfield | Mar. 2, 1937 |
| 2,271,635 | Flett | Feb. 3, 1942 |

OTHER REFERENCES

Gregory, "Uses and Applications of Chemicals and Related Materials," vol. II, page 99, column 1, Reinhold Publishing Corporation, N. Y. (1944).